US009421554B2

(12) United States Patent
Gardiner et al.

(10) Patent No.: US 9,421,554 B2
(45) Date of Patent: Aug. 23, 2016

(54) CLASSIFIER

(71) Applicant: FLSmidth A/S, Valby (DK)

(72) Inventors: Michael J. Gardiner, Capalaba (AU); Taavi Orupold, Woolloongabba (AU)

(73) Assignee: FLSmidth A/S (DK)

( * ) Notice: Subject to any disclaimer, the term of this patent is extended or adjusted under 35 U.S.C. 154(b) by 0 days.

(21) Appl. No.: 14/787,504

(22) PCT Filed: May 1, 2013

(86) PCT No.: PCT/IB2013/053425
§ 371 (c)(1),
(2) Date: Oct. 28, 2015

(87) PCT Pub. No.: WO2014/177911
PCT Pub. Date: Nov. 6, 2014

(65) Prior Publication Data
US 2016/0074874 A1    Mar. 17, 2016

(51) Int. Cl.
*B03B 5/62* (2006.01)
*B01J 8/20* (2006.01)

(52) U.S. Cl.
CPC . *B03B 5/623* (2013.01); *B01J 8/20* (2013.01)

(58) Field of Classification Search
CPC ............ B03B 5/62; B03B 5/623; B01J 8/20; B01J 8/36; B01D 21/0045; B01D 21/0048
See application file for complete search history.

(56) References Cited

U.S. PATENT DOCUMENTS

| | | | | |
|---|---|---|---|---|
| 1,939,121 A * | 12/1933 | Kent | ........................ | B03B 4/00 209/467 |
| 2,147,234 A * | 2/1939 | Bird | ........................ | B03B 5/22 209/155 |
| 4,089,782 A * | 5/1978 | Huebner | ................ | B01D 21/10 210/206 |
| 4,151,084 A * | 4/1979 | Probstein | ........... | B01D 21/0051 210/322 |
| 4,202,778 A * | 5/1980 | Middelbeek | ....... | B01D 17/0211 210/522 |
| 4,595,504 A * | 6/1986 | Hellman | ............ | B01D 17/0208 210/519 |
| 4,681,683 A * | 7/1987 | Lindstol | ............. | B01D 21/0045 210/521 |
| 4,889,624 A * | 12/1989 | Soriente | ............. | B01D 21/0045 210/232 |
| 5,173,195 A | 12/1992 | Wright | | |
| 5,605,636 A * | 2/1997 | Wyness | .............. | B01D 21/0018 210/195.3 |
| 6,224,833 B1 * | 5/2001 | Rall | ....................... | B01J 8/0055 422/139 |
| 6,814,241 B1 * | 11/2004 | Galvin | ...................... | B01J 8/22 209/158 |
| 6,851,558 B2 * | 2/2005 | Ingels | ....................... | B01J 2/16 209/476 |
| 7,334,689 B2 * | 2/2008 | Galvin | .................... | B03B 11/00 210/521 |
| 8,945,401 B2 * | 2/2015 | Cook | ................. | B01D 21/0069 210/521 |
| 2010/0133156 A1 * | 6/2010 | Han | ......................... | C02F 3/06 210/109 |
| 2013/0023397 A1 * | 1/2013 | Galvin | ..................... | B03B 5/32 494/79 |
| 2014/0216986 A1 * | 8/2014 | Orupold | .................... | B03B 1/00 209/3.1 |

FOREIGN PATENT DOCUMENTS

| | | |
|---|---|---|
| WO | 0045959 A1 | 8/2000 |
| WO | 2004087326 | 10/2004 |
| WO | 2011150455 A1 | 12/2011 |

OTHER PUBLICATIONS

The Supplementary European Search Report and Opinion dated Apr. 25, 2016, 7 pages, EP 13 88 3835.

* cited by examiner

*Primary Examiner* — Joseph C Rodriguez
(74) *Attorney, Agent, or Firm* — Matthew R. Weaver; Daniel DeJoseph; Jeffrey A. Sharp

(57) ABSTRACT

Disclosed herein are embodiments of a classifier (100) for classification of particles according to their size and/or weight. Classifiers (100) disclosed herein may include a mixing chamber (120), and a separation chamber (110), where the separation chamber may be separable into parts. Classifiers (100) disclosed herein may include a fluidizing chamber (130). The separation chamber (110) may include a de-aeration chamber (151) and a launder (117).

12 Claims, 7 Drawing Sheets

CLASSIFIER

TECHNICAL FIELD

The invention relates to a classifier. In particular, although not exclusively, the invention relates to a reflux classifier for separation of materials, such as ore particles, in mining and mineral processing.

BACKGROUND OF THE INVENTION

The classification of particles according to their size and/or weight is often used in mineral processing. In order to classify these particles it is common to locate the particles in a solution to form a slurry. This slurry is then passed through various types of equipment in order to separate the particles into different sizes and/or densities.

One of these types of equipment is a classifier that separates particles according to their size and/or density. Reflux classifiers typically have a slurry which is fluidised and passed through a plurality of parallel plates, or lamellae, which use gravity to separate solid particles from the liquid.

While such reflux classifiers have been found to be relatively efficient at separating, they are bulky and difficult to transport, primarily because of the volume required around the parallel plates. This means that they are expensive to install, often requiring specialised transportation equipment adapted to carrying oversize loads. This not only limits their use in small scale and temporary operations, but it may even mean that they cannot be installed where desired due to infrastructure restrictions (e.g. over a bridge or through a tunnel).

It will be clearly understood that any reference herein to background material or information, or to a prior publication, does not constitute an admission that any material, information or publication forms part of the common general knowledge in the art, or is otherwise admissible prior art, whether in Australia or in any other country.

OBJECT OF THE INVENTION

It is an object of the invention to overcome or at least alleviate one or more of the above problems and/or provide the consumer with a useful or commercial choice.

Other objects of the present invention will become apparent from the following description.

DISCLOSURE OF THE INVENTION

In one form, although it need not be the only or indeed the broadest form, disclosed is a classifier comprising:
 a mixing chamber for locating a slurry; and
 a separation chamber in fluid communication with the mixing chamber to separate solids from the slurry;
 wherein at least the separation chamber is separable into a plurality of parts.

The classifier may further comprise a fluidizing chamber connected to the mixing chamber. At least the mixing chamber and separation chamber may be separably mounted. The separation chamber may comprise at least one de-aeration chamber and/or at least one launder.

The separation chamber may comprise a series of plate arrays. The plate arrays may comprise a plurality of parallel plates. The plurality of parallel plates may be inclined. The separation chamber may be separable into two parts, a first portion and a second portion, typically for transportation. Each of the first portion and the second portion may contain a series of plate arrays. Each of the first portion and the second portion may contain at least one de-aeration chamber and/or at least one launder.

Each of the first portion and the second portion may comprise a portion of a housing that encompasses the plate arrays. Each portion of the housing may comprise at least an end wall and two side walls. The plate arrays of each portion may be inclined in the same direction with respect to the end walls such that when the two portions are mounted together the arrays of each portion are inclined in opposed directions.

The first portion and second portion may have a mounting system to affix the two portions together. The mounting system may comprise at least one flange on each of the first portion and second portion. The at least one flange may have a plurality of apertures and the first portion and the second portion of the separation chamber are affixed together by fasteners received in the apertures. The fasteners may include nuts and bolts.

The separation chamber may have an outlet. The outlet may have an overflow flange attached thereto. The outlet may be located along a seam between the parts of the separation chamber. The overflow flange may assist in affixing parts of the separation chamber together for use.

The outlet may be fluidly connected to a collector which may be fluidly connected to launders. The launders may be fluidly connected to an outlet side of the plate arrays and processed material may traverse the plate arrays, launders, and collector before reaching the outlet. A plurality of launders may feed into a single collector. The collector may be located between two opposed sets of plate arrays. The launders may be arranged along opposed sides of the collector.

The separation chamber may have an inlet. The inlet may have an inlet flange attached thereto. The inlet may be located along a seam between the parts of the separation chamber. The inlet flange may assist in affixing parts of the separation chamber together for use.

The inlet may be fluidly connected to an inlet chamber. The inlet chamber may be located between two opposed sets of plate arrays. The inlet chamber may have a plurality of de-aeration chambers connected thereto. The de-aeration chambers may be arranged along opposed sides of the inlet chamber. The inlet chamber may be located below the collector and/or the inlet chamber and collector may be centrally located between the plate arrays. Both the inlet chamber and collector may be formed from the plurality of parts of the separation chamber.

The slurry that is classified may be any mineralized slurry. Normally, although not exclusively, the slurry is a coal slurry.

The classifier may include at least one hatch to enable access to the inside. The hatch may be located in the mixing chamber.

In another embodiment, disclosed is a classifier comprising:
 a mixing chamber for locating a slurry; and
 a separation chamber in fluid communication with the mixing chamber to separate solids from the slurry;
 wherein the separation chamber has a collector located between two opposed plate arrays.

The classifier may further comprises an inlet chamber. The inlet chamber may also be located between the two opposed plate arrays. In one embodiment, the inlet chamber is located below the collector. At least one de-aeration chambers may be located on either side of the inlet chamber. At least one launder may be located on either side of the collector.

Further features of the present invention will become apparent from the following detailed description.

BRIEF DESCRIPTION OF THE DRAWINGS

To assist in understanding the invention and to enable a person skilled in the art to put the invention into practical effect, embodiments of the invention will be described by way of example only with reference to the accompanying drawings, wherein.

DETAILED DESCRIPTION

Figure 1:
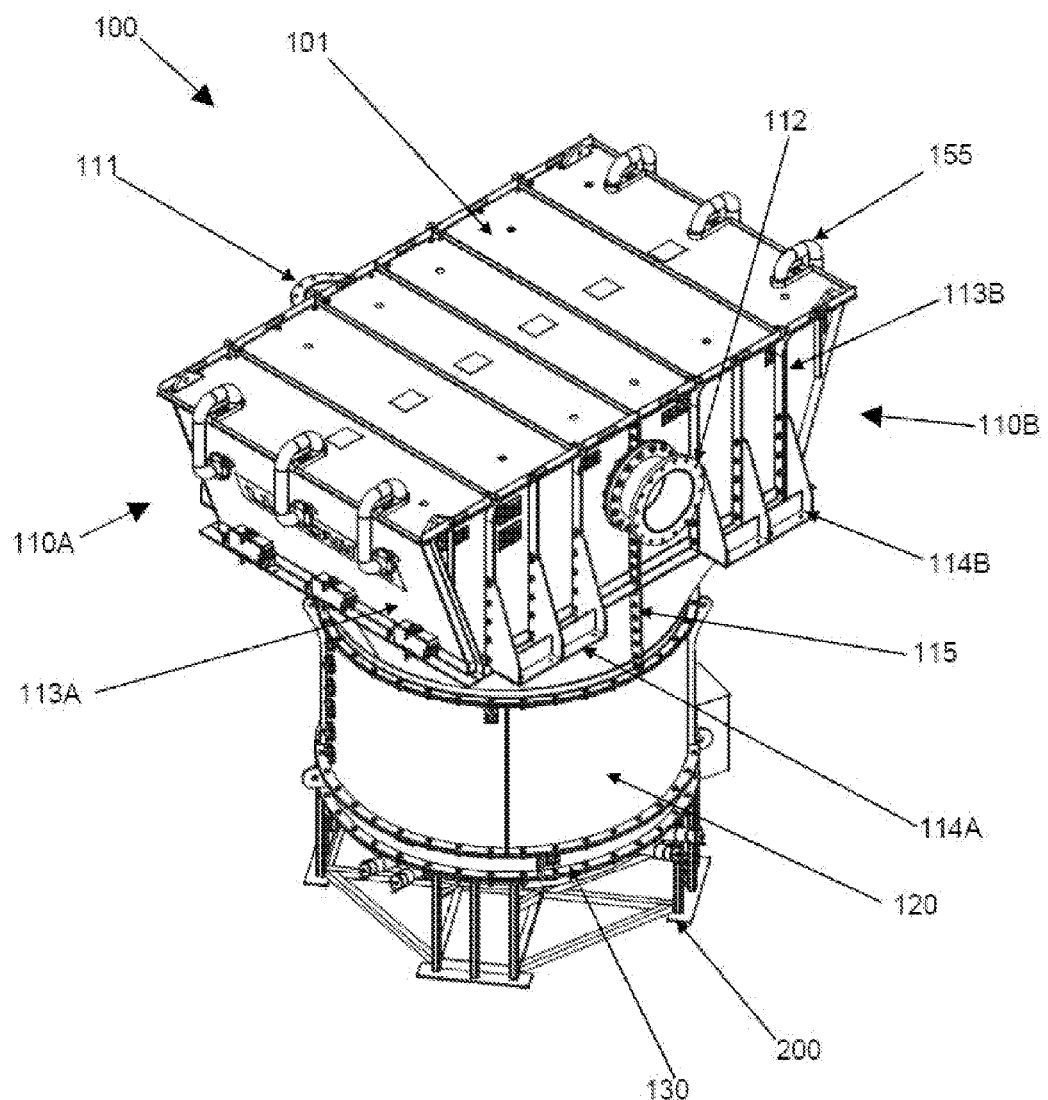
FIG. 1 is a perspective view of a classifier according to an embodiment of the invention.
Figure 2:
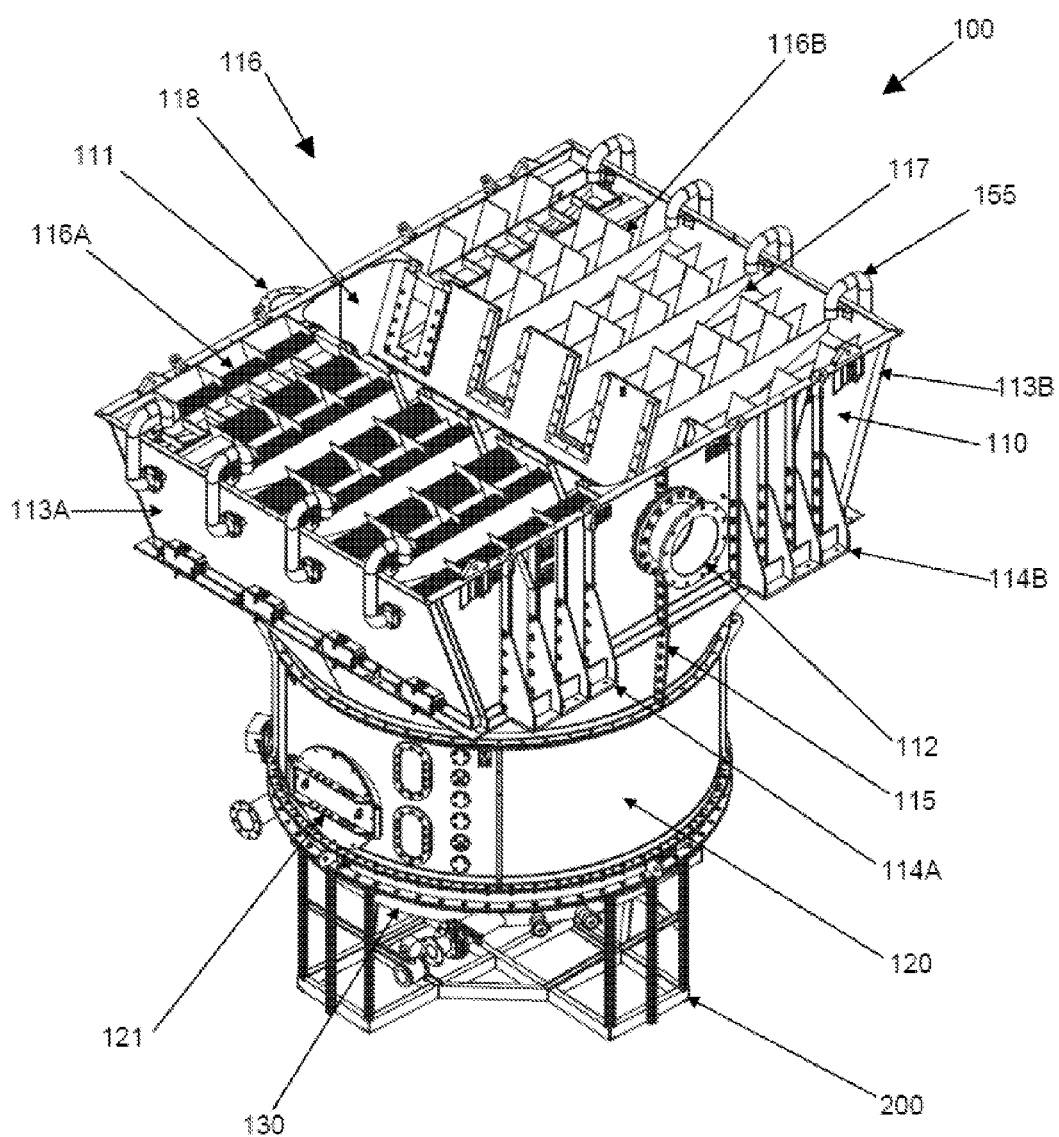
FIG. 2 is a perspective view of a classifier, with its cover removed, according to another embodiment of the invention.
Figure 3:
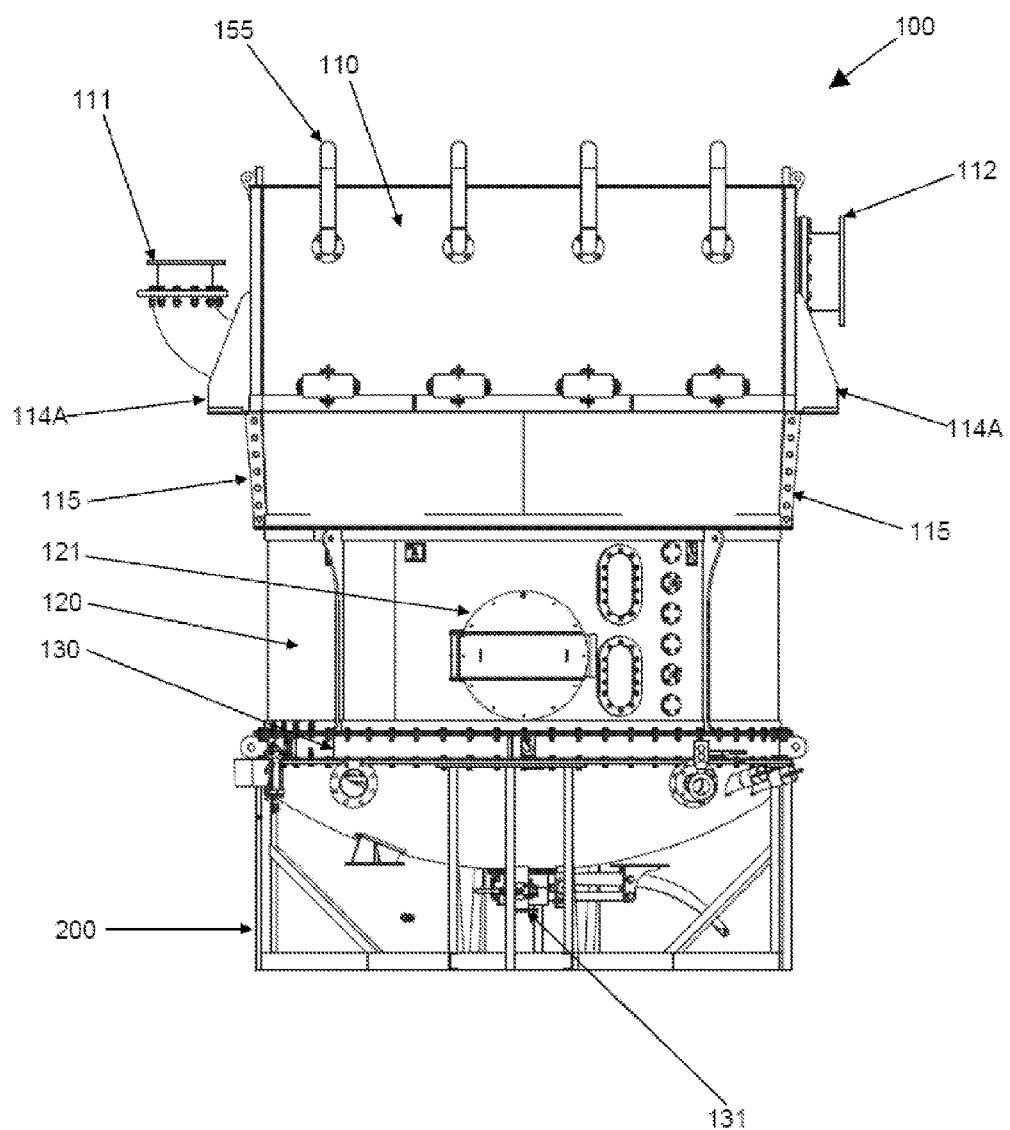
FIG. 3 is a side elevation view of the classifier illustrated in FIG. 2.
Figure 4:
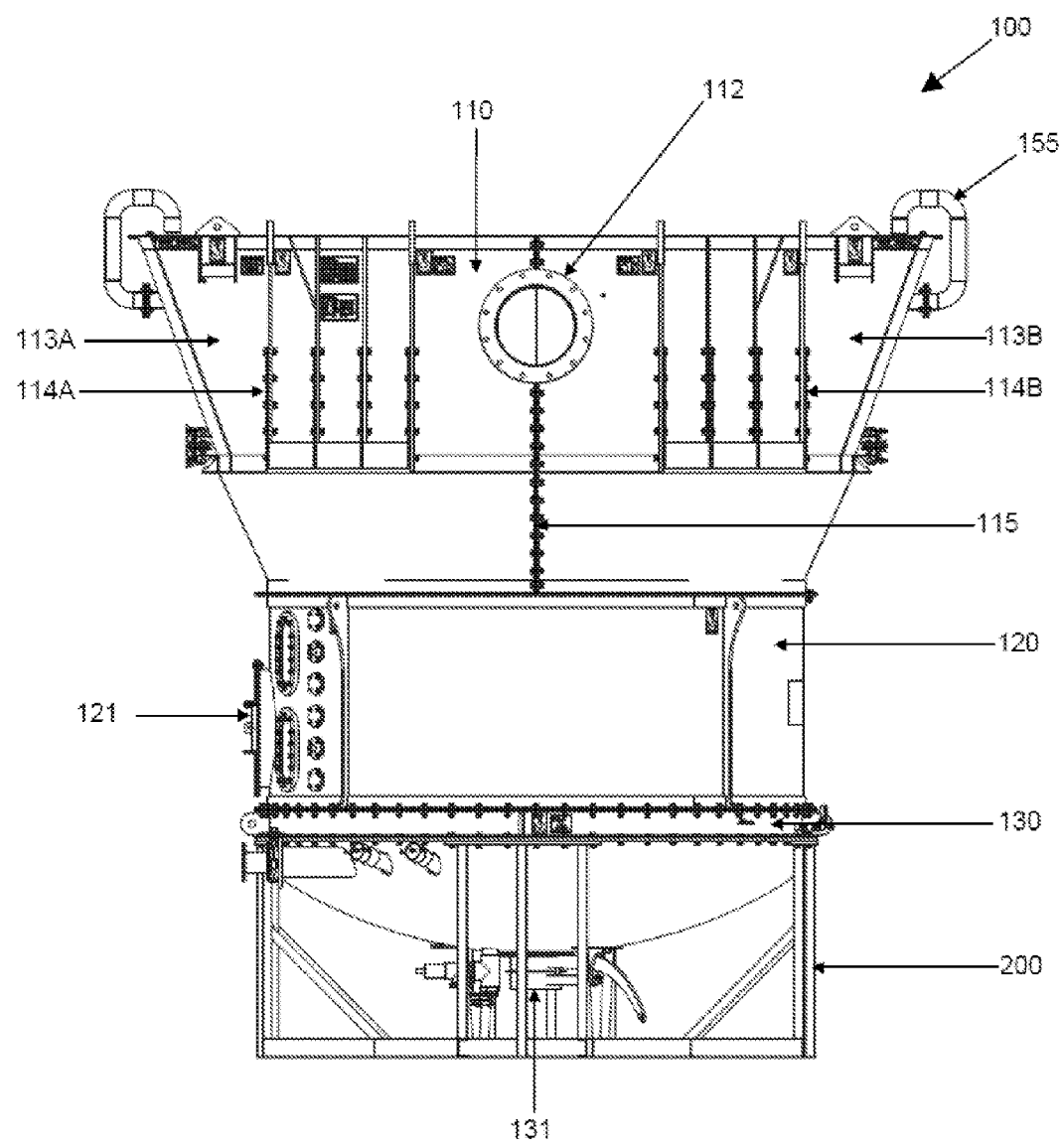
FIG. 4 is a front elevation view of the classifier illustrated in FIG. 2.

FIGS. 1 and 5 to 7 illustrate a first embodiment of the invention and FIGS. 2 to 4 illustrate a second embodiment of the invention. The two embodiments are similar with the first embodiment illustrating a cover 101 and the second embodiment being generally larger than the first and having no cover illustrated. Like numbering is used to describe common features between the two embodiments and they will therefore be referred to simultaneously.

FIGS. 1 to 7 illustrate two embodiments of a classifier in the form of a reflux classifier 100 used to separate material, such as coal particles, on the basis of size and weight. The reflux classifier 100 has a separation chamber in the form of a lamella chamber 110 located on top of a mixing chamber 120 which is located above a fluidising chamber 130. The reflux classifier 100 is illustrated on a stand 200 which is typically removed after installation.

The lamella chamber 110 has an inlet 111 and an outlet 112 and is in fluid communication with the mixing chamber 120 and the fluidising chamber 130. The lamella chamber 110 is formed of a plurality of separable parts. In the illustrated embodiments of the reflux classifier 100 the lamella chamber 110 is formed from two portions, namely a first part 110A having a first portion of a housing 113A and a second part 110B having a second portion of a housing 113B. Together the two portions 110A and 110B form a complete lamella chamber 110. Both the first and second portions of housing 113A and 113B have supports 114A and 114B, respectively, that can be used to mount the reflux classifier 100 to an external structure (not shown).

The first part 110A and second part 110B of the lamella chamber 110 each have a mounting system, in the form of corresponding flanges 115 (illustrated together in the figures), to affix the two portions together as shown. The flanges 115 each have a plurality of apertures (not shown) that receive fasteners in the form of nuts and bolts. The inlet 111 and outlet 112 are both located along the seam between the first part 110A and second part 110B of the lamella chamber 110 and can be used to further affix first part 110A and second part 110B of the lamella chamber 110 together for use. If the first part 110A and second part 110B of the lamella chamber 110 are not to be separated again after installation, more permanent methods of affixing may be utilized instead of, or as well as, flanges 115 with nuts and bolts.

The lamella chamber 110 has a series of plate arrays in the form of a plurality of parallel plates 116 (see FIG. 2). The plurality of parallel plates 116 are split between the first part 110A and second part 110B of the lamella chamber 110 to form a first set of parallel plates 116A in the first part 110A and a second set of parallel plates 116B in the second part 110B. The parallel plates 116 are inclined relative to the axis of gravity to provide a classifying effect to material that passes through the plates 116. As can be seen in FIG. 2 the first set of parallel plates 116A is inclined in an opposite direction to the second set of parallel plates 116B.

A plurality of launders 117 are provided in each of the first part 110A and second part 110B of the lamella chamber 110 to catch particles located within the slurry after it has passed through the plurality of parallel plates 116. Each launder 117 has two substantially parallel side walls and an inclined base. The launders 117 are fluidly connected to a collector 118 which is located centrally between the first set of parallel plates 116A and the second set of parallel plates 116B. The collector 118 is generally 'V' shaped and receives material, such as coal slurry, once it has passed through the launders 117. The collector 118 is fluidly connected to the outlet 112 which enables processed material to exit the reflux classifier 100 from the collector 118.

The mixing chamber 120 has a hatch 121 that allows access therein for cleaning and maintenance, or the like. The fluidizing chamber 130, which keeps slurry in a fluid state, has an underflow valve 131. The underflow valve 131 is located adjacent the bottom of the fluidizing chamber 130 for removal of heavier particles and solids.

The lamella chamber 110 is mounted to the mixing chamber 120 by way of flanges with nuts and bolts. This allows the lamella chamber 110 to be separated from the mixing chamber 120. The same applies between the mixing chamber 120 and the fluidizing chamber 130 which allows the reflux classifier 100 to be broken down into smaller pieces for transportation, or the like.

Figure 5:
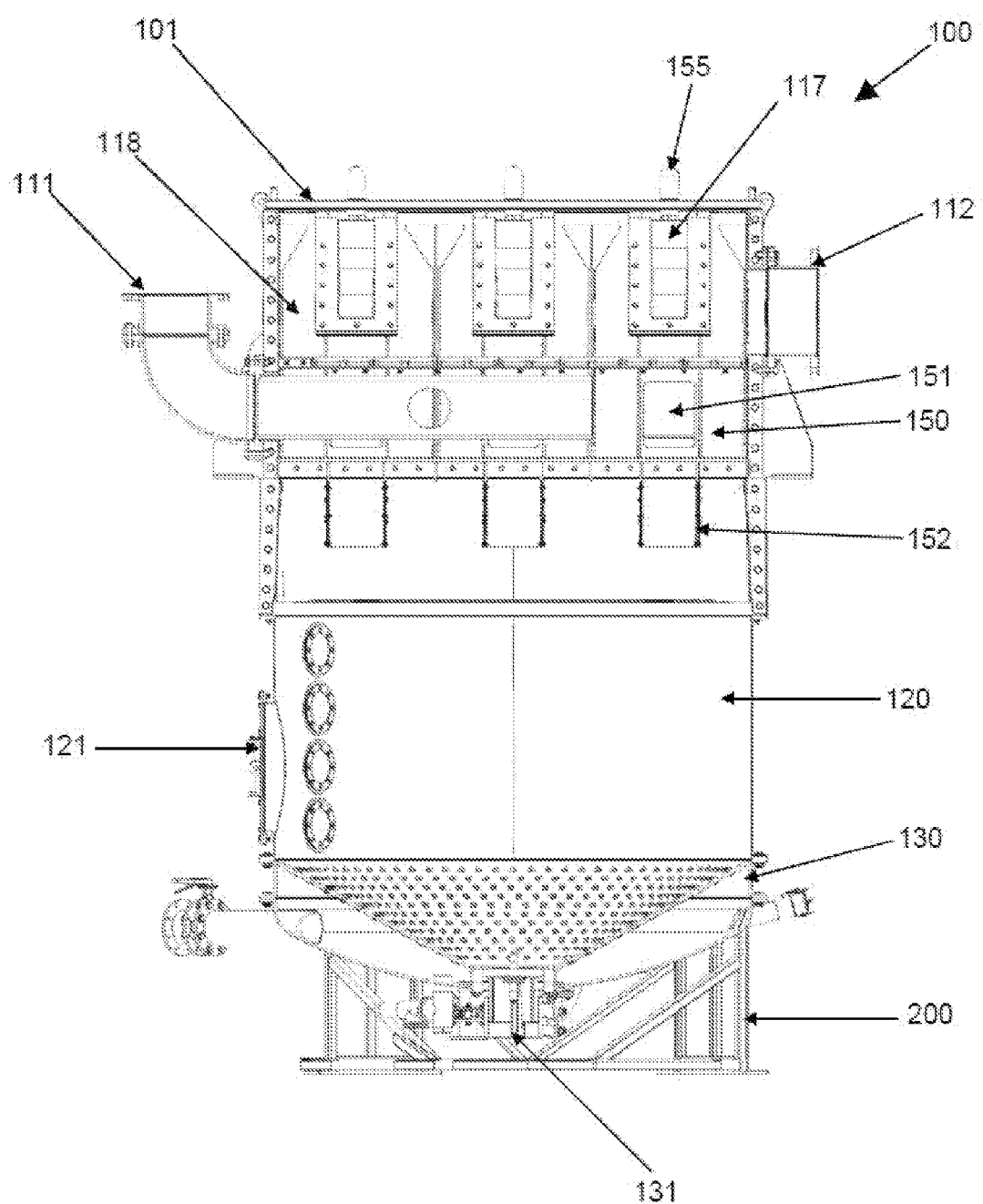
FIG. 5 is a side elevation cross sectional view of the classifier illustrated in FIG. 1.
Figure 6:
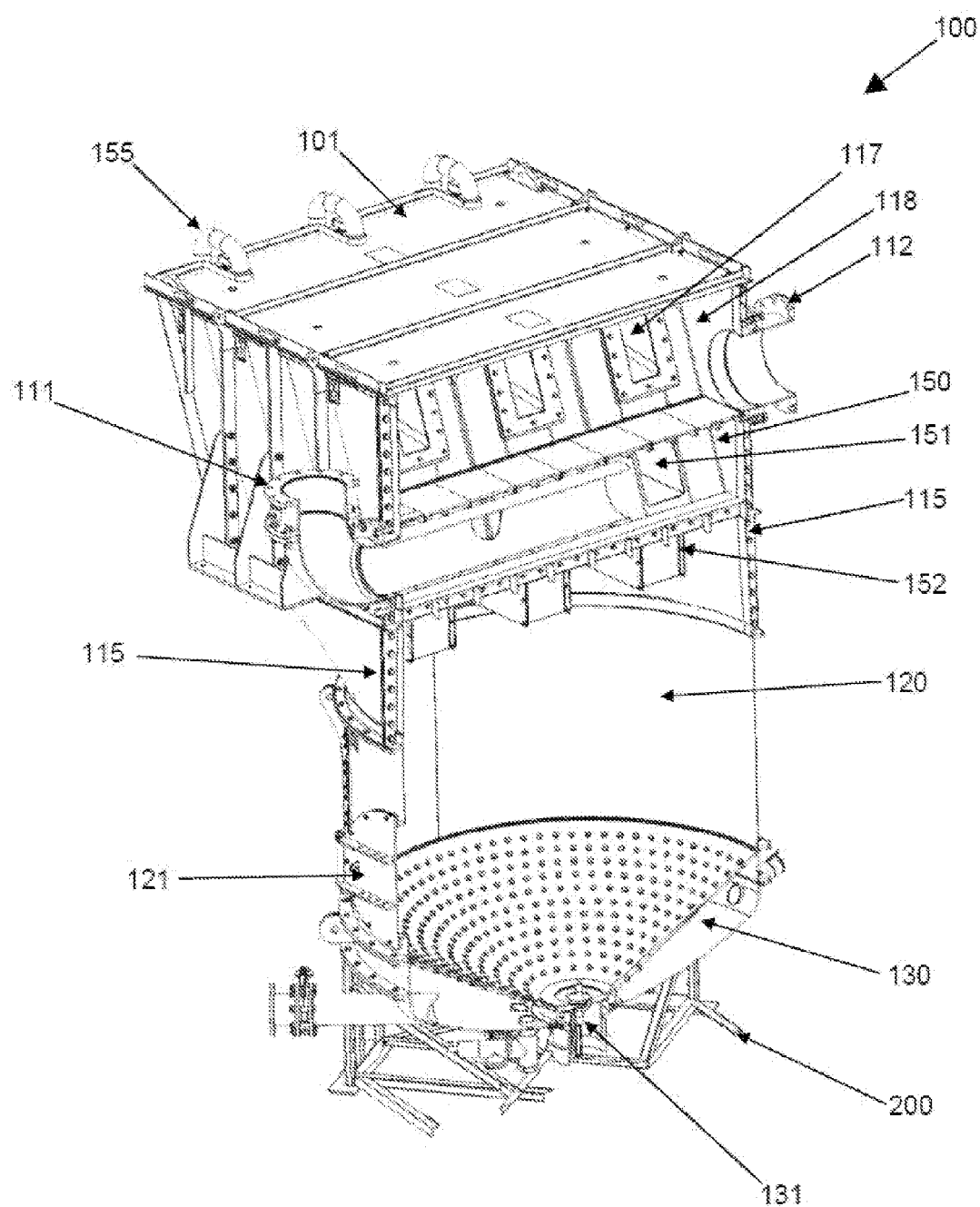
FIG. 6 is a perspective cross sectional view of the classifier illustrated in FIG. 1.
Figure 7:
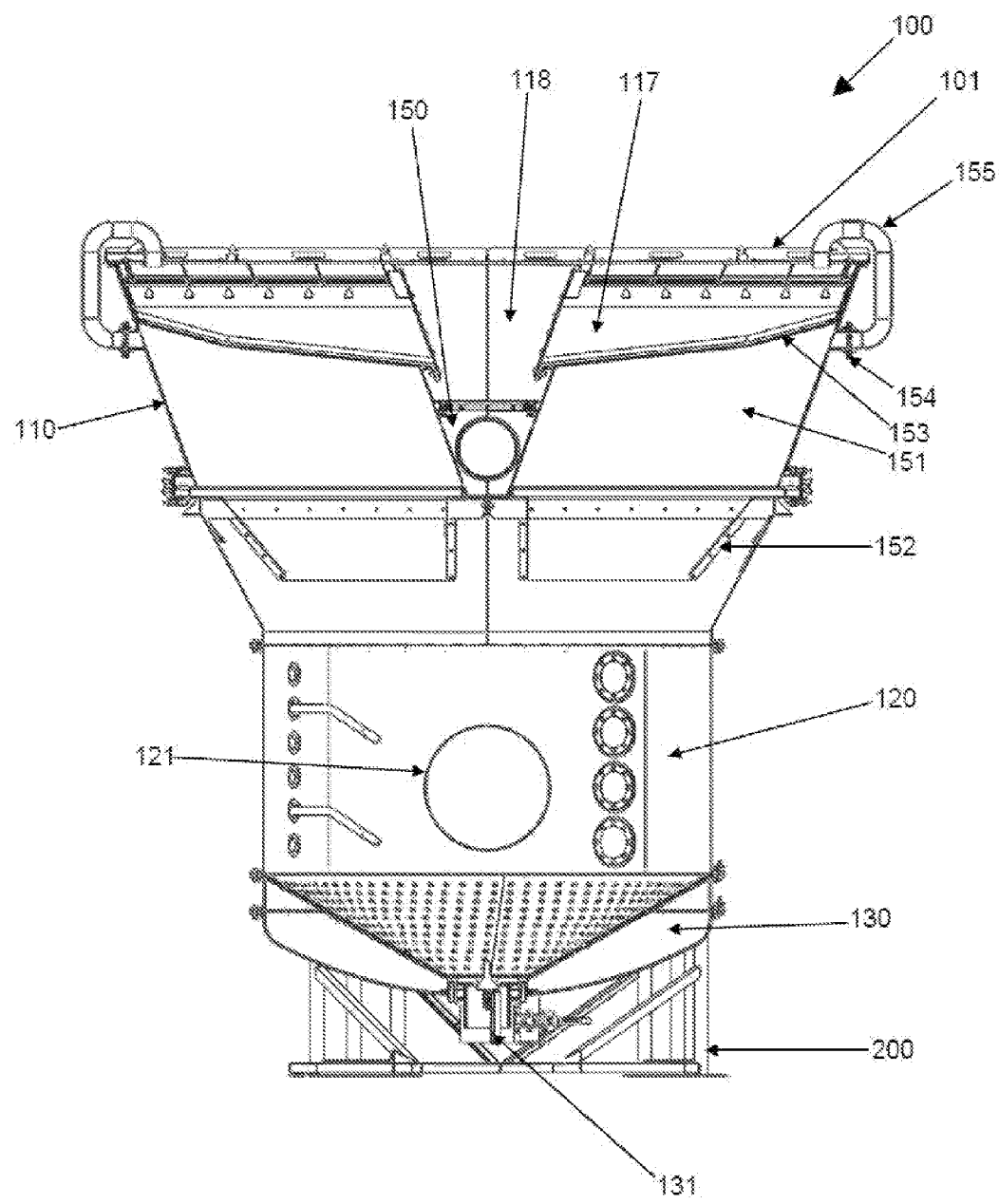
FIG. 7 is another side elevation cross sectional view of the classifier illustrated in FIG. 1.

FIGS. 5 to 7 illustrate cross sectional views of the reflux classifier 100 where various internal components can be seen more clearly. The inlet 111 is fluidly connected to an inlet chamber 150 which has a plurality of de-aeration chambers 151 connected thereto. The de-aeration chambers 151 each have a chute 152 that is fluidly connected to the mixing chamber 120 allowing slurry from the inlet chamber 150 to make its way to the mixing chamber 120 for further processing after being de-aerated.

A top of each de-aeration chamber 151 is inclined, defined by an inclined base of respective launders 117 located directly above the de-aeration chambers 151. An inclined de-aeration face 153, as seen in FIG. 7, urges lighter air particles upwards, toward an air outlet 154 at the top of the de-aeration chamber 151. An air pipe 155 is connected to the air outlet 154 and is fluidly connected to the respective launders to allow air particles to bypass the mixing chamber 120 and lamella chamber 110. It should be appreciated that the tops of the de-aeration chambers 151 need not be formed from the inclined bases of the respective launders 40 and may be formed irrespective of the launders 40. That is, the de-aeration faces 153 may be formed by other means.

The mixing chamber 120 receives material to be processed, such as coal slurry, from an open bottom of the de-aeration chambers 151. The mixing chamber 120 can then deliver the material to the lamella chamber 110. Fluidizing chamber 130 ensures that material in the mixing chamber 120 remains in a fluid state for processing.

In use, the reflux classifier 100 can be transported in separate parts and put together on site relatively easily. Once installed, material to be separated, such as coal slurry, is fed into the inlet 111 where it is processed by the reflux classifier 100. Specifically, the material to be processed is passed from inlet 111 to inlet chamber 150 and then distributed to any one of a plurality of de-aeration chambers 151. Any air in the material rises and is urged toward air outlet 154 by inclined faces 153 of the de-aerators 151, from where it is transferred to the launders 117 by air pipes 155.

From the de-aeration chambers 151 the material then travels down chutes 152 to the mixing chamber 120 located below the lamella chamber 110. The slurry is then fluidized by the fluidizing chamber 130 and then passes upwardly through the parallel plates 116 of the lamella chamber 110 where particles located within the coal slurry are sorted according to size and weight. Heavy and large particles pass into the bottom of the mixing chamber 120 where they can be removed through underflow valve 131 into a tundish (not shown) or similar. The lighter and smaller particles are able to pass through the plates 116 where they pass into the launders 117, into the collector 118 and out of the outlet 112.

Advantageously, the reflux classifier 100 can be separated into manageable parts for transportation and then constructed on site. This can provide more flexibility for transportation and can significantly reduce transportation costs. Furthermore, it may enable the reflux classifier 100 to be used in situations where it could not otherwise be used due to size restrictions on transportation. Similar improvements can be found in decommissioning the reflux classifier 100 as it is more manageable to disassemble and remove from site.

The opposing arrangement of parallel plates 116A and 116B allows a single collector 118 and outlet 112 to be used despite the two separate sets of parallel plates 116A and 116B with associated launders 117. The centrally located inlet chamber 150 and collector 118 allow for more de-aeration chambers 151 and launders 117 to be provided than would otherwise be possible without having multiple inlets and outlets and increased complexity. Furthermore, the integrated de-aeration chambers 151 in the separable lamella chamber 110 allows for removal of air particles from material to be processed, providing better separation of solids and generally improving throughput and efficiency of the reflux classifier 100.

In this specification, adjectives such as first and second, left and right, top and bottom, and the like may be used solely to distinguish one element or action from another element or action without necessarily requiring or implying any actual such relationship or order. Where the context permits, reference to an integer or a component or step (or the like) is not to be interpreted as being limited to only one of that integer, component, or step, but rather could be one or more of that integer, component, or step etc.

The above description of various embodiments of the present invention is provided for purposes of description to one of ordinary skill in the related art. It is not intended to be exhaustive or to limit the invention to a single disclosed embodiment. As mentioned above, numerous alternatives and variations to the present invention will be apparent to those skilled in the art of the above teaching. Accordingly, while some alternative embodiments have been discussed specifically, other embodiments will be apparent or relatively easily developed by those of ordinary skill in the art. The invention is intended to embrace all alternatives, modifications, and variations of the present invention that have been discussed herein, and other embodiments that fall within the spirit and scope of the above described invention.

In the present specification and claims (if any), the word "comprising" and its derivatives including "comprises" and "comprise" include each of the stated integers but does not exclude the inclusion of one or more further integers unless the context of use indicates otherwise.

What is claimed is:

1. A classifier comprising:
   a mixing chamber for locating a slurry; and
   a separation chamber in fluid communication with the mixing chamber to separate solids from the slurry;
   wherein the separation chamber has a first portion and a second portion;
   wherein each of the first portion and the second portion contain a series of plate arrays comprised of plates, each plate having a first vertical face and a second vertical face;
   wherein the plate arrays of each portion are located on a same horizontal axis; and
   wherein the plate arrays of each portion are inclined in opposed directions such that the first face of each plate in the plate array of the first portion faces the first face of each plate in the plate array of the second portion in order to direct the slurry to a region between the first portion and the second portion.

2. The classifier of claim 1, wherein the classifier further comprises a fluidizing chamber connected to the mixing chamber.

3. The classifier of claim 1, wherein at least the mixing chamber and separation chamber are separably mounted.

4. The classifier of claim 1, wherein the separation chamber comprises at least one de-aeration chamber and at least one launder.

5. The classifier of claim 1, wherein at least the separation chamber is separable into a plurality of parts.

6. The classifier of claim 1, wherein each of the first portion and the second portion contain at least one de-aeration chamber.

7. The classifier of claim 1, wherein each of the first portion and second portion contain at least one launder.

8. The classifier of claim 1, wherein the separation chamber further comprises an outlet.

9. The classifier of claim 1, wherein the separation chamber further comprises an inlet.

10. The classifier of claim 8, wherein the outlet is located between the plate arrays of each portion.

11. The classifier of claim 9, wherein the inlet is located between the two plate arrays.

12. The classifier of claim 1, wherein the separation chamber is separable into the first portion and the second portion.

* * * * *